(12) United States Patent
Tran

(10) Patent No.: US 11,958,608 B1
(45) Date of Patent: Apr. 16, 2024

(54) TECHNIQUES FOR MONITORING PASSENGER LOADING AND UNLOADING IN A COMMERCIAL PASSENGER VEHICLE

(71) Applicant: Panasonic Avionics Corporation, Irvine, CA (US)

(72) Inventor: Danny Ngoc Quang Tran, Garden Grove, CA (US)

(73) Assignee: PANASONIC AVIONICS CORPORATION, Irvine, CA (US)

( * ) Notice: Subject to any disclaimer, the term of this patent is extended or adjusted under 35 U.S.C. 154(b) by 0 days.

(21) Appl. No.: 18/058,135

(22) Filed: Nov. 22, 2022

(51) Int. Cl.
  *B64D 11/00* (2006.01)
  *G06V 20/59* (2022.01)
  *H04N 21/214* (2011.01)

(52) U.S. Cl.
  CPC ........ *B64D 11/00155* (2014.12); *G06V 20/59* (2022.01); *H04N 21/214* (2013.01)

(58) Field of Classification Search
  None
  See application file for complete search history.

(56) References Cited

U.S. PATENT DOCUMENTS

| | | | | |
|---|---|---|---|---|
| 8,744,926 B1* | 6/2014 | Heron | ................ | G06Q 50/28 |
| | | | | 705/26.7 |
| 10,296,860 B2* | 5/2019 | Agrawal | ................ | G06V 20/52 |
| 11,006,078 B1* | 5/2021 | Patel | ................ | H04N 7/181 |
| 11,038,971 B2* | 6/2021 | Mohr | ................ | H04W 4/021 |
| 11,055,800 B2* | 7/2021 | Singh | ................ | G06Q 50/265 |
| 11,395,022 B1* | 7/2022 | Chachare | ................ | H04N 21/252 |
| 2008/0270160 A1* | 10/2008 | Bang | ................ | G06Q 30/0226 |
| | | | | 705/14.27 |
| 2015/0262006 A1* | 9/2015 | Yomogida | ................ | G06Q 30/0272 |
| | | | | 705/14.62 |
| 2018/0160464 A1* | 6/2018 | Zhang | ................ | H04W 12/08 |
| 2019/0377959 A1* | 12/2019 | Marano | ................ | B64D 47/08 |
| 2020/0074152 A1* | 3/2020 | Nakamura | ................ | G06V 20/52 |
| 2020/0377232 A1* | 12/2020 | Gonzalez Parra | ................ | B64D 45/00 |
| 2021/0055116 A1* | 2/2021 | Kim | ................ | H04W 4/029 |
| 2021/0124910 A1* | 4/2021 | Eom | ................ | G06V 40/171 |
| 2021/0311498 A1* | 10/2021 | Okazaki | ................ | G06Q 10/06312 |
| 2021/0334916 A1* | 10/2021 | Lin | ................ | G06Q 10/0631 |
| 2021/0339885 A1* | 11/2021 | Doherty | ................ | B64F 1/002 |
| 2022/0058762 A1* | 2/2022 | Goddard | ................ | G06Q 50/30 |

* cited by examiner

*Primary Examiner* — Ricky Chin
(74) *Attorney, Agent, or Firm* — Perkins Coie LLP

(57) ABSTRACT

A system for tracking passenger behaviors of passengers on a commercial passenger vehicle is provided. The system comprises: media playback devices located on the commercial passenger vehicle, the media playback devices being associated with passenger seats and configured to operate in an onboard check-in mode, and an onboard server in communication with the media playback devices and configured to receive, from a media playback device associated with a passenger seat of a passenger, passenger identification information of the passenger and update passenger boarding information to indicate a completion of a boarding process of the passenger. The onboard server is further configured to provide, to at least one of a ground terminal or a crew terminal, passenger boarding information that enables determination of a time interval between a start of the boarding process by each passenger and an end of the boarding process as indicated from the media playback devices.

20 Claims, 11 Drawing Sheets

US 11,958,608 B1

TECHNIQUES FOR MONITORING PASSENGER LOADING AND UNLOADING IN A COMMERCIAL PASSENGER VEHICLE

TECHNICAL FIELD

This document is generally related to systems, methods, and apparatus to monitor passenger loading and unloading in commercial passenger vehicles such as airplanes, passenger trains, buses, cruise ships, and other forms of transportation.

BACKGROUND

Commercial travel has evolved with the increasing popularity of personal electronic devices (PEDs) that passengers carry on board, as well as media player devices provided in commercial passenger vehicles. Furthermore, most modern commercial passenger vehicles include communication and display electronics, commonly referred to as in-flight entertainment and communication (IFEC) equipment.

SUMMARY

This patent document describes, among other things, various implementations for tracking entry and exit by passengers on a commercial passenger vehicle.

In one aspect, a system for tracking passenger behaviors of passengers on a commercial passenger vehicle is provided. The system comprises: media playback devices located on the commercial passenger vehicle, the media playback devices being associated with passenger seats and configured to operate in an onboard check-in mode in which the media playback devices receive passenger identification information of the passengers; and an onboard server in communication with the media playback devices and configured to receive, from a media playback device associated with a passenger seat of a passenger, passenger identification information of the passenger and update passenger boarding information to indicate a completion of a boarding process of the passenger, wherein the onboard server is further configured to provide, to at least one of a ground terminal located outside of the commercial passenger vehicle or a crew terminal on the commercial passenger vehicle, passenger boarding information that enables determination of a time interval between a start of the boarding process by each passenger and an end of the boarding process as indicated from the media playback devices.

In another aspect, a method for tracking passenger behaviors of passengers on a commercial passenger vehicle is provided. The method comprises: controlling media playback devices associated with passenger seats on the commercial passenger vehicle to operate in an onboard check-in mode in which the media playback devices receive passenger identification information of the passengers; upon receiving passenger identification information of a passenger from a media playback device associated with a passenger seat, updating passenger boarding information to indicate a completion of a boarding process of the passenger; and providing the passenger boarding information to at least one of a ground terminal located outside of the commercial passenger vehicle or a crew terminal on the commercial passenger vehicle, the passenger boarding information that enables determination of a time interval between a start of the boarding process by each passenger and an end of the boarding process as indicated from the media playback devices.

In yet another exemplary aspect, the above-described method is embodied in the form of processor-executable code and stored in a computer-readable program medium.

The above and other aspects and their implementations are described in greater detail in the drawings, the description, and the claims.

DETAILED DESCRIPTION

Various implementations of the disclosed technology provide techniques for monitoring passengers loading and unloading in a commercial passenger vehicle. The tracking techniques can be utilized in various manners to improve passenger experiences in the commercial passenger vehicle. In some implementations, the techniques for tracking passenger's boarding time and the tracked time is analyzed to provide various data that can be utilized for facilitating the boarding and/or disembarking process.

The conventional boarding process proceeds by checking a boarding pass of a passenger at a gate terminal, for example, by scanning a passenger's boarding pass. Such conventional boarding process simply focuses on checking the presence of a passenger with a boarding pass at a gate terminal before the passenger gets on board the commercial passenger vehicle. According to the conventional boarding process, there is no data obtained or tracked once the passenger passes the gate terminal. The presence of the passenger at the gate terminal before the passenger gets on board is a separate event from the presence of the passenger at a passenger seat after the passenger gets on board. Since the conventional boarding process does not provide any mechanism for checking or confirming the actual presence of the passenger after the passenger gets on board, to check the actual presence of passengers onboard, a flight attendant manually counts the number of passengers onboard. Such manual counting is not efficient since it takes time and it is easy to cause errors.

The technical solutions described in this patent document provide mechanisms to check or confirm the passenger's presence at the passenger seat in the airplane. The implementations of the disclosed technology can provide passenger boarding data, for example, time taken by the passenger to move from the gate terminal to the passenger seat, which exhibits the passenger's boarding behaviors. Some implementations of the disclosed technology also provide techniques for analyzing and utilizing the passenger boarding data to improve passenger experience in a commercial passenger vehicle. In some implementations, the passenger boarding data can be utilized to optimize a boarding and/or disembarking process.

Various implementations will be discussed in detail with reference to the figures below. In the description, an airplane is described as an example of the passenger vehicle, but the implementations of the disclosed technology can be applicable to other passenger vehicles such as buses, trains, ships, and other types of commercial passenger vehicles.

Figure 1:
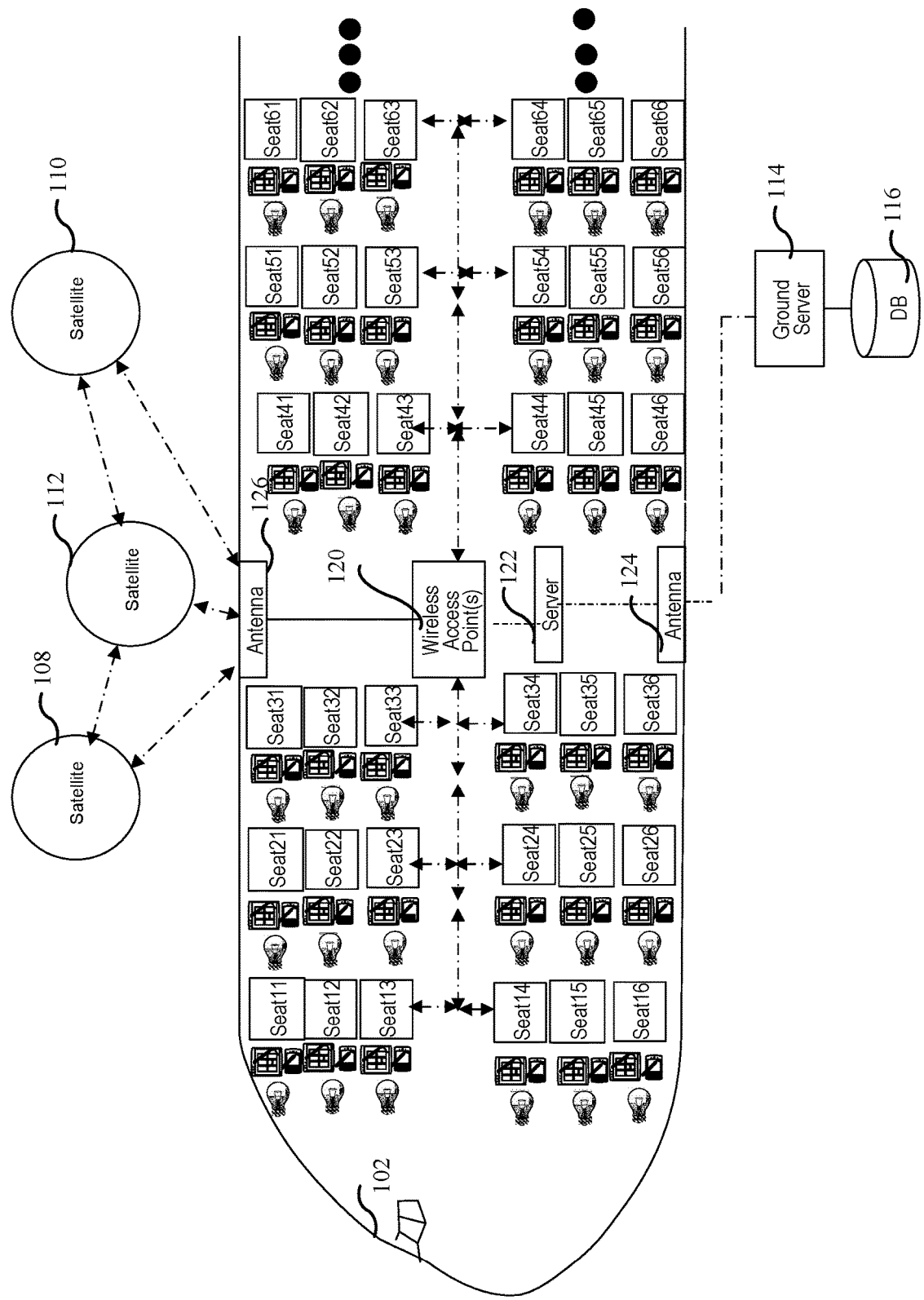
FIG. 1 shows an example of an in-flight entertainment (IFE) system installed in an airplane based on some implementations of the disclosed technology.

FIG. 1 shows an example of an in-flight entertainment (IFE) system installed in an airplane 102. The IFE system provides various entertainment and connectivity services to passengers on board. Referring to FIG. 1, the IFE system includes a server 122, antenna 126, and antenna 124. The components shown as a single element in FIG. 1 (e.g., the server 122, the wireless access point 120, etc.) can be configured in multiple elements. For example, the in-flight service system can include multiple wireless access points to facilitate or support providing wireless coverages for the passengers. The passengers carry their own devices, which include the PEDs (illustrated by the light bulb icon in FIG. 1) and other wireless electronic devices. The PEDs may refer to any electronic computing device that includes one or more processors or circuitries for implementing the functions related to data storage, video and audio streaming, wired communications, wireless communications, etc. The examples of the PEDs include cellular phones, smart phones, tablet computers, laptop computers, and other portable computing devices. In the implementations of the disclosed technology, the PEDs may have the capability to execute application software programs ("apps") to perform various functions.

In FIG. 1, the airplane 102 is depicted to include multiple passenger seats, Seat 11 to Seat 66. The media playback devices (illustrated by screen icon), are provided at each passenger seat and configured with capabilities for video and audio streaming, Internet communications, and other capabilities. In some implementations, the media playback devices are provided at each passenger seat, such as located at each of the seatbacks of the passenger seats, and/or on cabin walls and/or deployable from an armrest for seats located at a bulkhead (i.e., in the first row of a section). The media playback devices have displays providing interfaces to each passenger through which each passenger enters his or her selections on the entertainment option, e.g., the particular selections, emergency requests, etc. Upon receiving the selection from the passengers, based on the selections from the passengers, the media playback device displays entertainment content and travel information. In the implementations of the disclosed technology, the media playback devices can operate in a check-in mode which is separate from an entertain mode that receives the selections on the entertainment options from passengers and provides corresponding entertainment content. The media playback devices can operate in the check-in mode until the passengers complete the onboard check-in process after getting on board and operate in the entertain mode after the passengers complete the onboard check-in. To encourage the passengers to complete the onboard check-in process, various graphic user interface (GUI) functions can be suggested and displayed on the media playback devices. More details will be further discussed later in this document.

The server 122 is communicably coupled with media playback devices and the PEDs and perform various operations including processing requests/inputs from passengers and providing data to passengers. In some implementations of the disclosed technology, the server 122 may perform a passenger tracking process as discussed with reference to FIG. 3 and a passenger disembarking process as discussed with reference to FIG. 8. The communications between the server 122 and the passengers' onboard devices including the media playback devices and the PEDs are either realized by wired connections or wireless connections. In some implementations, the communication among the server 122, the media playback devices, and the PEDs are achieved through the antenna 124 to and from the ground-based cell towers by, for example, a provision of network plugs at the seat for plugging PEDs to a wired onboard local area network. In some other implementations, the communications among the server 122, the media playback devices, and the PEDs are achieved through the antenna 126 to and from satellites 108, 110, 112 in an orbit (e.g., via a cellular network utilizing one or more onboard base station(s), Wi-Fi utilizing the wireless access point 120, and/or Bluetooth).

In some implementations, a crew terminal is provided in the airplane 102 utilized by a ground crew, a cabin crew, or a flight crew to access the IFE maintenance functions such as loading new content, replenishing multimedia content digital rights management (DRM) keys, and so on. The crew terminal is in communication with other devices of the IFE system such as the server 122, media playback devices, the PEDs, and the ground server and operates to support the passenger tracking techniques as suggested in this patent document. In some implementations, the crew terminal can be implemented as a part of the server 122. In some implementations, the crew terminal is in communication with the gate terminal to facilitate the boarding process. In some implementations, the gate terminal and the onboard crew terminal store apps to support the boarding process. For example, the applications may store instructions to start, proceed, stop, and finish the boarding process by detecting certain conditions. The gate terminal and the crew terminal are typically accessed by a gate agent or a crew member responsible for overseeing boarding operation. User ID and passwords may be required to authorize the access to the gate terminal and the onboard crew terminal to facilitate identifying of the agent or crew member conducting the boarding operation and to prevent unauthorized access to the system.

The server 122, the media playback devices, and the PEDs form a local network on board the airplane 102 through an onboard router (not shown). The server 122 is also communicably coupled with the ground server 114 through the antenna 126 for receiving and transmitting information from/to the ground server 114. The ground server 114 can be located at various locations, including a gate where passengers check-in the boarding pass right before passengers are on board, a computer center at an arbitrary location on the ground, etc. In some examples, the gate terminal may correspond to the ground server 114 located at the gate and thus can be one example of the ground server 114. The ground server 114 may be in communication with the database 116 and provide information from the database 116 to the server 122 and store information received from the server 122 in the database 116. Although FIG. 1 shows that the database 116 is provided separately from the ground server 114, the database 116 can be provided as a part of the ground server 114.

Although not shown in FIG. 1, the IFE system may further include a database which stores passenger information, for example, profiles of the passengers (name, age, etc.), preferred entertainment options (movies, music, shows, etc.), preferred entertainment content (e.g., genres of movies), etc. The passenger information can be obtained in multiple manners and is stored in the database of the IFE system. In some implementations, the passenger information is obtained prior to the passengers coming on board (e.g., at the time of purchasing the tickets or checking in for the flights), or at other times. In some implementations, the passenger information can be obtained and shared by an association of several airplane companies and retrieved from the database 116. In some implementations, the passenger information can be updated during the trip.

Figure 2:
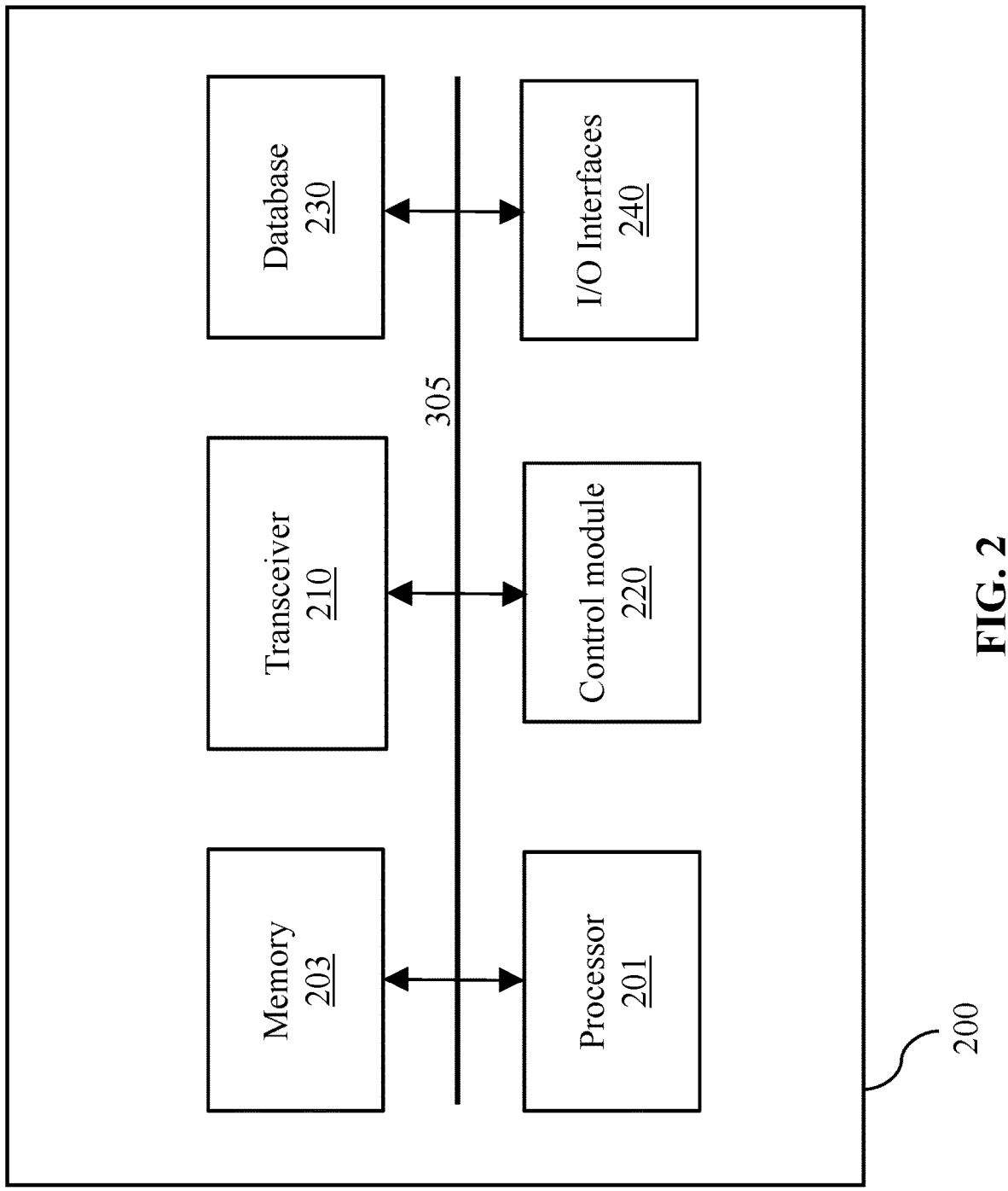
FIG. 2 shows an example block diagram of a computing device based on some implementations of the disclosed technology.
Figure 3:
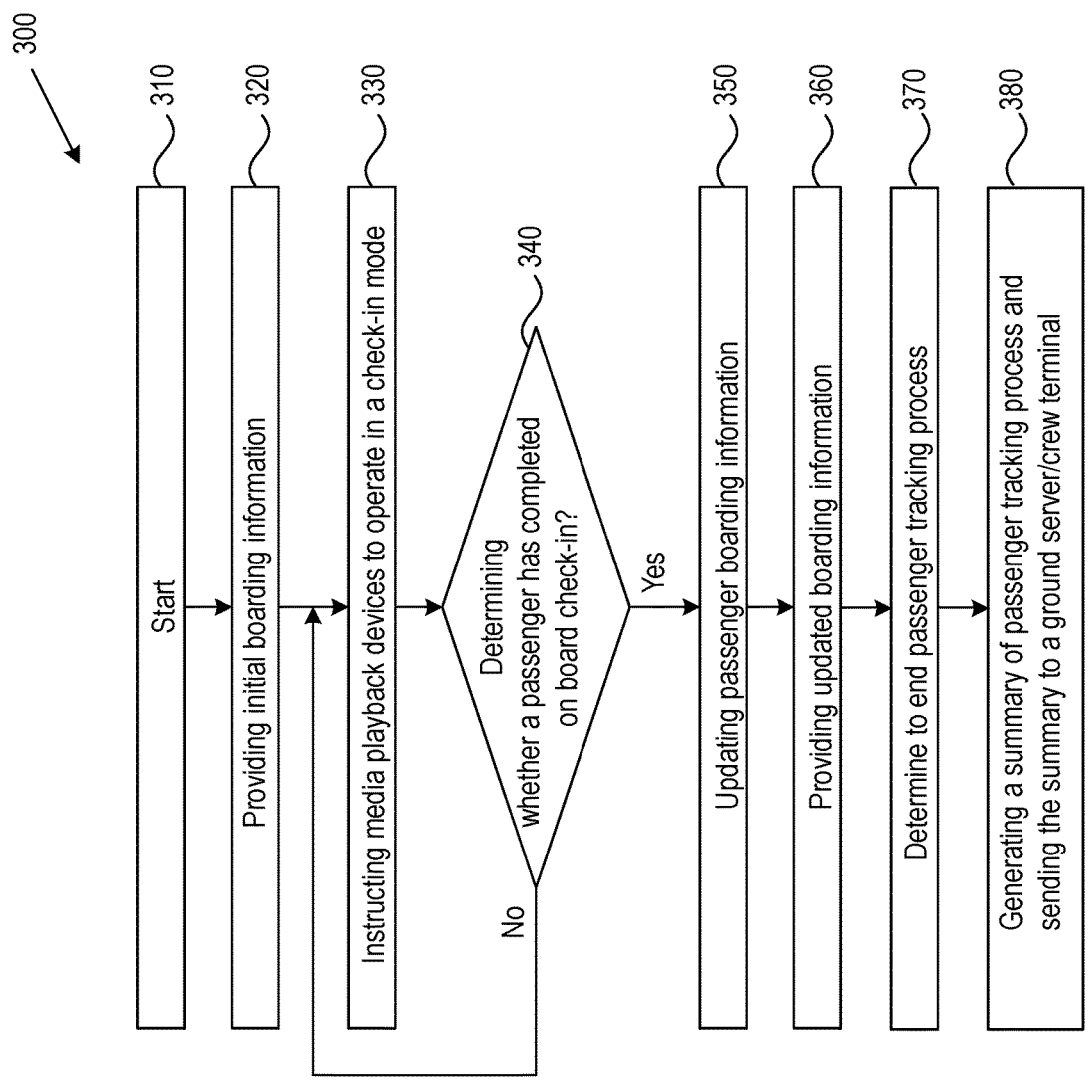
FIG. 3 shows an example flowchart of operations that are performed by a passenger tracking system based on some implementations of the disclosed technology.
Figure 7:
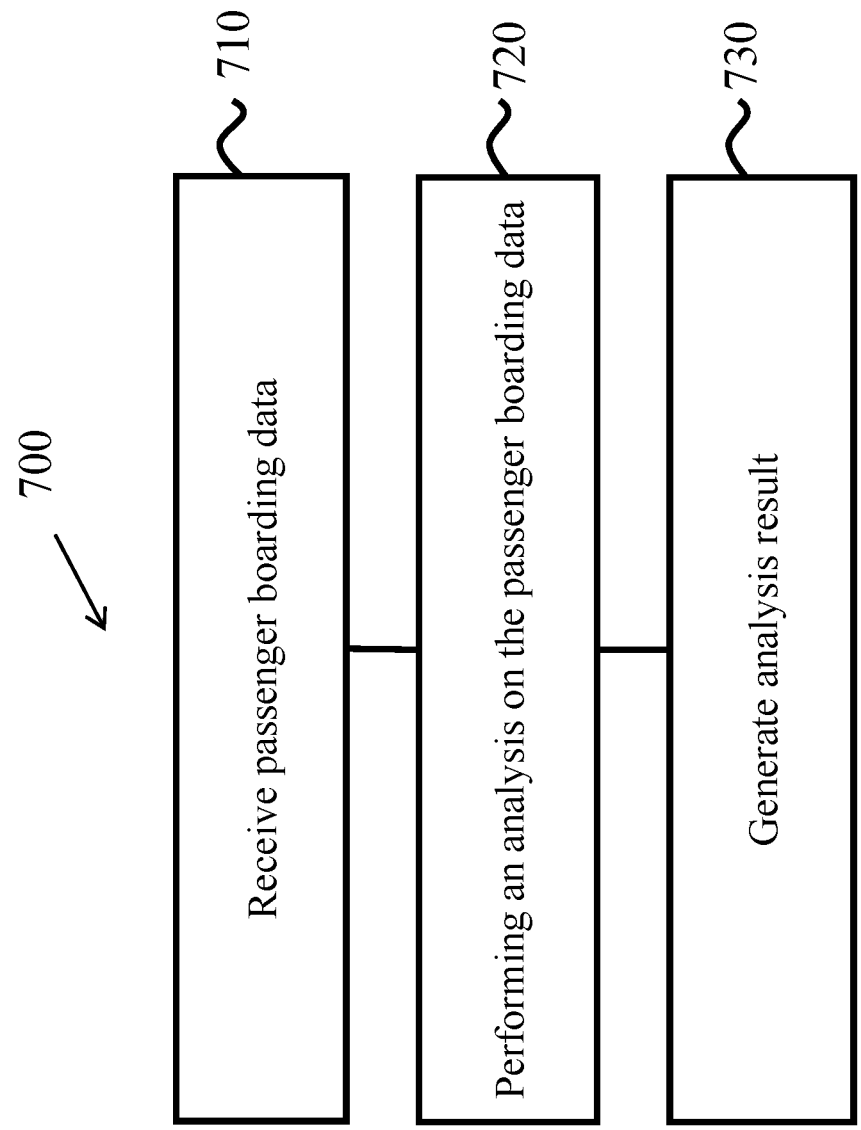
FIG. 7 shows an example of a flowchart of operations that are performed by an analysis server for analyzing passenger boarding data based on some implementations of the disclosed technology.
Figure 8:
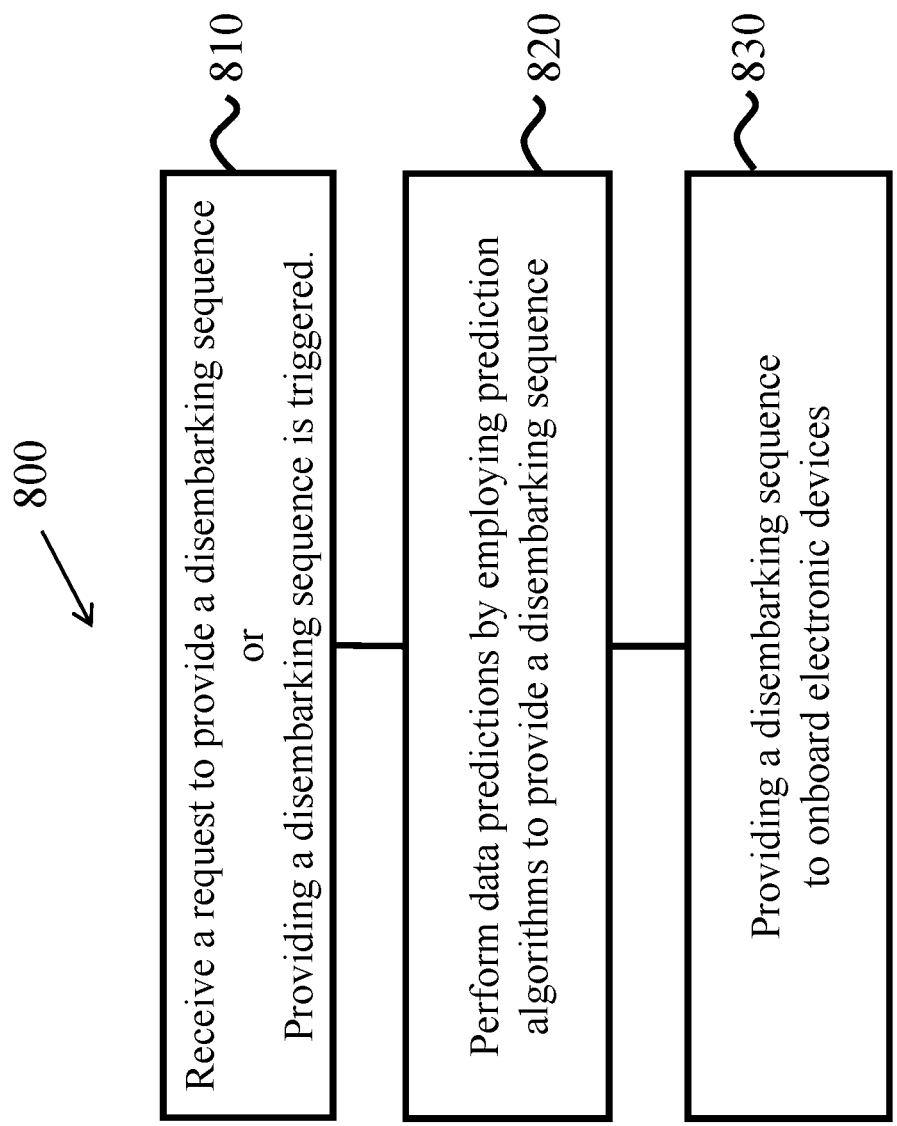
FIG. 8 shows an example of a flowchart of operations that are performed by an onboard server for providing a disembarking sequence based on some implementations of the disclosed technology.

FIG. 2 shows an example block diagram of a computing device (e.g., an onboard server, a PED, a ground server, or a crew terminal) based on some implementations of the disclosed technology. The computing device 200 includes at least one processor 201, a memory 203, a transceiver 210, a control module 220, a database 230, and an input/output (I/O) interface 240. In other embodiments, additional, fewer, and/or different elements may be used to configure the computing device 200. The memory 203 may store instructions and applications to be executed by the processor 201. The memory 203 is an electronic holding place or storage for information or instructions so that the information or instructions can be accessed by the processor 201. The memory 203 can include, but is not limited to, any type of random access memory (RAM), any type of read-only memory (ROM), any type of flash memory, such as magnetic storage devices (e.g., hard disk, floppy disk, magnetic strips, etc.), optical disks (e.g., compact disc (CD), digital versatile discs (DVD), etc.), smart cards, flash memory devices, etc. The instructions upon execution by the processor 201 configure the computing device 200 to perform the operations (e.g., the operations as shown in FIG. 3, 7 or 8), which will be described in this patent document. The instructions executed by the processor 201 may be carried out by a special purpose computer, logic circuits, or hardware circuits. The processor 201 may be implemented in hardware, firmware, software, or any combination thereof. The term "execution" is, for example, the process of running an application or the carrying out of the operation called for by an instruction. The instructions may be written using one or more programming language, scripting language, assembly language, etc. By executing the instruction, the processor 201 can perform the operations called for by that instruction.

The processor 201 operably couples with the memory 203, the transceiver 210, the control module 220, the database 230, and the I/O interface 240, to receive, send, and process information and to control the operations of the computing device 200. The processor 201 may retrieve a set of instructions from a permanent memory device, such as a ROM device, and copy the instructions in an executable form to a temporary memory device that is generally some form of RAM. In some implementations, the computing device 200 can include a plurality of processors that use the same or a different processing technology. The transceiver 210 may include a transmitter and a receiver. In some embodiments, the device 200 comprises a transmitter and a receiver that are separate from one another but functionally form a transceiver. The transceiver 210 transmits or sends information or data to another device (e.g., another server, a PED, etc.) and receives information or data transmitted or sent by another device (e.g., another server, a PED, etc.).

The control module 220 of the computing device 200 is configured to perform operations to assist the computing device 200. In some implementations, the control module 220 can be configured as a part of the processor 201. When the computing device 200 corresponds to the IFE system as shown in FIG. 1, the control module 220 can be included in the airplane 102. In some implementations, the control module 220 can operate machine learning/artificial intelligence (AI) applications that perform various types of data analysis to automate analytical model building. Using algorithms that iteratively learn from data, machine learning applications can enable computers to learn without being explicitly programmed. The machine learning/AI module may be configured to use data learning algorithms to build models to interpret various data received from the various devices or components to detect, classify, and/or predict future outcomes. Such data learning algorithms may be associated with rule learning, artificial neural networks, inductive logic programming, and/or clustering. In some implementations, the control module 220 may assist the computing device 200 to perceive their environment and take actions that maximize the effectiveness of the operations performed by the computing device 200.

The I/O interfaces 240 enable data to be provided to the computing device 200 as input and enable the device computing 200 to provide data as output. In some embodiments, the I/O interfaces 240 may enable user input to be obtained and received by the computing device 200 (e.g., via a touch-screen display, buttons, or switches) and may enable the computing device 200 to display information. In some embodiments, devices, including touch screen displays, buttons, controllers, audio speakers, or others, are connected to the computing device 200 via I/O interfaces 240.

FIG. 3 shows an example flowchart of operations that are performed by a passenger tracking system based on some implementations of the disclosed technology. In some implementations, the passenger tracking system may be implemented by the server 122 as shown in FIG. 1, which is in communication with media playback devices, PEDs, a crew terminal, and one or more ground servers.

At an operation 310, the passenger tracking system starts a passenger tracking process. The passenger tracking process starts once the passenger boarding process is initiated at the gate terminal and/or the crew terminal. The boarding process can be initiated manually or automatically. For example, the boarding process can be initiated by a crew member or a gate agent by, for example, entering an input instructing to initiate the boarding process. In another example, the boarding process can be initiated automatically, for example, a predetermined time prior to an expected departure time.

In some implementations, the passenger tracking process can start after receiving a notification from the gate terminal and/or the crew terminal that the passenger boarding process is initiated. As discussed with reference to FIGS. 1 and 2, the gate terminal and the onboard crew terminal are communicatively coupled to the IFE system and have the capability of sending the notification to notify the start of the passenger tracking process. When the passenger tracking process starts after receiving the notification from the gate terminal and/or the crew terminal, such notification can be exchanged in real time and the delay to start the passenger tracking system after the passenger boarding process is initiated at the gate terminal and the crew terminal is ignorable. Prior to the start of the boarding process, the gate terminal and the crew may already have a list of passenger information of expected passengers. In some implementations, the list of passenger information of the expected passengers may be provided from the gate terminal and/or the crew terminal to the passenger tracking system. At an operation 320, the passenger tracking system provides initial boarding information to a gate terminal and a crew terminal.

Figure 4:
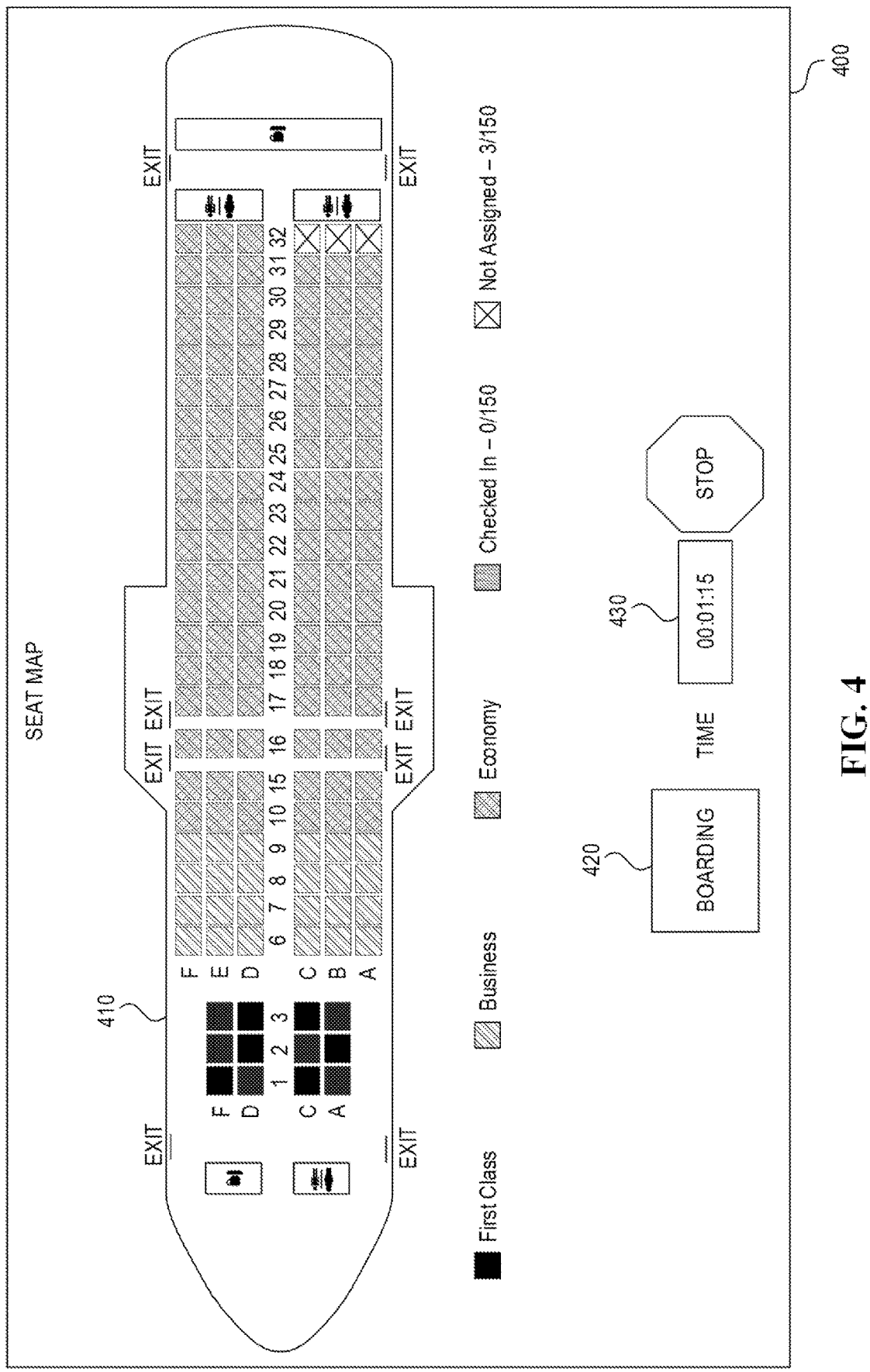
FIG. 4 illustrates an example of a screen illustrating initial boarding information provided from a passenger tracking system based on some implementations of the disclosed technology.

FIG. 4 illustrates an example of a screen illustrating the initial boarding information provided from the passenger tracking system to the gate terminal and/or the onboard crew terminal based on some implementations of the disclosed technology. In the example, the screen 400 shows a seat map 410, a boarding state indicator 420, and a timer 430. The seat map 410 shows the different types of seats, e.g., the first class seats, business class seats, and economy seats. The seat map 410 also shows the seats which are not assigned to any passengers based on the list of the passenger information of the expected passengers, which is received from the gate terminal or the crew terminal. In the example of FIG. 4, all seats are shown as being not checked in yet. The passenger tracking system will update the check-in status of each passenger seat in the seat map as passengers completes the onboard check-in after the passengers are seated in the passenger seats.

In the example as shown in FIG. 4, the boarding state indicator 420 indicates "BOARDING" since the screen 400 is provided after the boarding process begins. In some implementations, the boarding state indicator 420 may be designed to show different status, e.g., 'START BOARDING' indicating the status that the boarding process has not started yet, 'BOARDING' indicating the status that the boarding process is currently proceeding, and 'BOARDING COMPLETE' indicating the status that the boarding process has been completed. Although as described the boarding state indicator 420 shows three different states, it is an example only and the number of the states can be varied without being limited to three.

In the example as shown in FIG. 4, the timer 430 is shown to indicate time information related to the passenger boarding behaviors. In some implementations, the timer 430 can be designed to indicate a time taken from when a first passenger's ticket is scanned at the gate terminal to when the passenger tracking system determines to end the passenger tracking process, which may be referred to as the total boarding time for the airplane. Although the screen 400 shows the single timer 430 only, different time information can be tracked during the passenger tracking process using additional timers. For example, an individual timer is configured to track time taken from when a boarding pass of a passenger is scanned at the gate terminal to when the passenger completes the onboard check-in from the passenger seat, which may be referred to as the individual boarding time associated with the passenger. This individual boarding time corresponds to a time interval between start of the boarding process by a passenger and an end of the boarding process as indicated from the media playback device associated with the passenger. The gate terminal, which is communicatively coupled to the IFE system and the onboard crew terminal, is configured to send a signal or a notification to the IFE system when a passenger's boarding pass is scanned at the gate so that the passenger tracking system can track time related to passenger boarding behaviors of the corresponding passenger. Depending on time information to be measured by a timer, the start and end times of the timer can be set accordingly. Although not shown, the screen 400 can provide more options to allow the crew member and/or the gate agent to start and/or stop the timer manually during the passenger tracking process.

The conventional boarding process does not provide any mechanism to track the effectiveness of the passenger boarding by tracking time taken by an individual passenger until the individual passenger is seated in the passenger seat. The implementations of the disclosed technology allow tracking of the individual boarding time associated with the passenger until the passenger is seated in the passenger seat after the passenger's boarding pass is scanned at the gate terminal. By obtaining the individual boarding time associated with the passenger, it is possible to monitor the effectiveness of each passenger. As further discussed later in this patent document, the individual boarding time can be analyzed and utilized to improve future boarding/disembarking process.

At an operation 330, the passenger tracking system instructs the media playback devices provided at the passenger seat to operate in a check-in mode, which refers to a state in which the IFE system can obtain the passenger's information that is needed to complete the onboard check-in from the passenger seat. In some implementations, the media playback devices operating in the check-in mode may display a message to request to complete the onboard check-in on the displays of the media playback devices.

Figure 5:
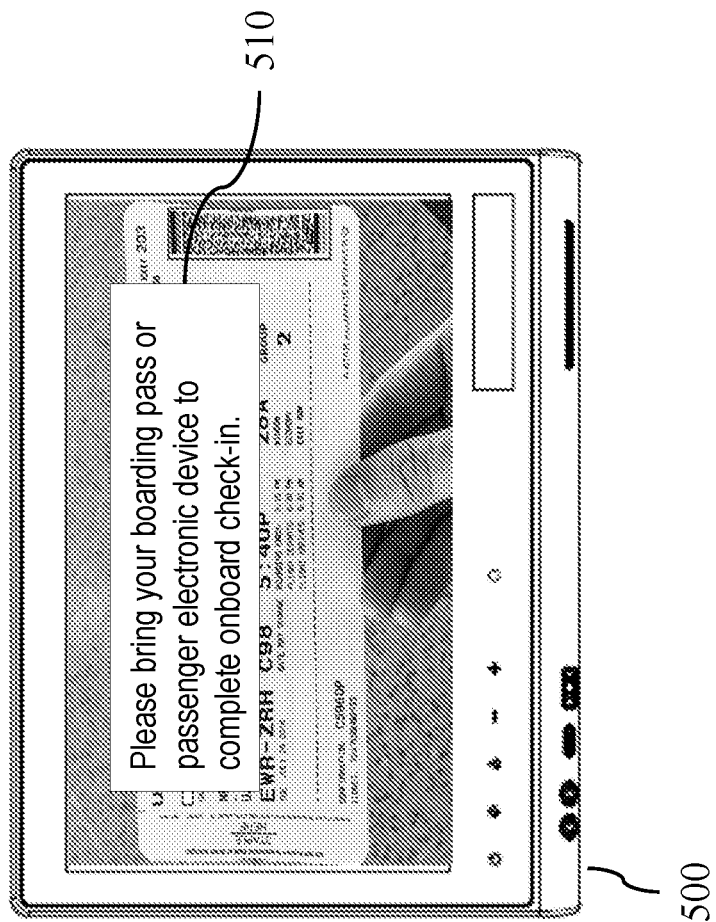
FIG. 5 shows an example of a screen provided on a display of a media playback device based on some implementations of the disclosed technology.

FIG. 5 shows an example of a screen provided on a display of a media playback device based on some implementations of the disclosed technology. On the screen 500, a message 510 ("Please bring your boarding pass or passenger electronic device to complete check-in") to request a passenger to proceed the onboard check-in is provided. The message 510 can remain on the screen 500 until the passenger completes the onboard check-in. In some implementations, during the check-in mode, the access from the passengers to the entertainment content such as movies, music, games, etc., is limited and the entertainment content becomes available only to the passengers only who have completed the onboard check-in on the passenger seats.

During the check-in mode, the IFE system can obtain the passenger's information, which is needed to complete the onboard check-in in various manners. The passenger's information needed to complete the onboard check-in may correspond to the passenger identification information assigned to each passenger and can be implemented in various manners such as QR codes, bar codes, patterns, characters, symbols, or others, which may be referred to as the passenger codes in the description below. In some implementations, in the check-in mode, the media playback device may detect and capture the optically readable passenger codes (e.g., QR code or bar code) included in a passenger ticket or stored in a personal electronic device of the passenger. For example, the media playback device is equipped with an imaging device (e.g., camera) for reading the passenger codes. If the passenger locates the physical passenger ticket or the electronic passenger ticket stored on the passenger's personal electronic device in a reading area of the imaging device of the media playback device, the imaging device can scan the passenger codes present on the physical or electronic passenger ticket. In some implementations, the passenger may use the imaging device (e.g., camera) of the passenger's personal electronic device to read the passenger codes on the passenger ticket and send the passenger codes to the IFE system through wireless connection services such as Wi-Fi and Bluetooth. In some other implementations, the media playback device can receive the passenger codes of the passenger without any scanning operation. For example, the passenger's personal electronic device has a software application configured to program the personal electronic device to pair with the IFE system and provide the passenger codes stored on the personal electronic device to the IFE system through wireless connection services such as Wi-Fi and Bluetooth. In some other implementations, the passenger can enter the passenger codes using the touch screen provided on the media playback device. In some implementations, during the check-in mode, the crew terminal can proceed with the onboard check-in from the crew terminal on behalf of a particular passenger, if needed. For example, for a particular passenger who is on board but in a special situation, the crew terminal can proceed with the onboard check-in on behalf of the particular passenger and the passenger tracking system will consider the onboard check-in from the crew terminal as valid. The passenger code information obtained in the check-in mode through the media playback devices and the crew terminal is provided to the passenger tracking system.

At an operation 340, the passenger tracking system checks whether the onboard check-in from a passenger seat has been completed. The onboard check-in from the passenger seat may be determined as completed if the passenger tracking system has received passenger codes corresponding to the passenger through the media playback device associated with the passenger seat. If the passenger tracking system has not received any passenger code information from a passenger seat ("No" in the operation 340), the media playback device continues to operate in the check-in mode and waits for the passenger to complete the onboard check-in. If the passenger tracking system receives the passenger codes through the media playback devices or the crew terminal ("Yes" in the operation 340), the operation 350 proceeds. In some implementations, when the passenger tracking system determines that the onboard check-in for the passenger has been completed, the media playback device associated with the passenger seat of the passenger is no longer in the check-in mode and operates to perform the normal IFE operations including providing entertainment content according to the passenger's selection of the services. When the media playback device operates to perform the normal IFE operations, the entertainment content provided to the passenger seat associated with the passenger can be customized based on the passenger codes received in the check-in mode. For example, the passenger tracking system can, from the ground server or the database in the IFE system, obtain preference on entertainment content associated with the passenger identified based on the passenger codes received in the check-in mode and provide customized or personalized entertainment content to the passenger.

At an operation 350, the passenger tracking system updates the passenger's boarding information. In some implementations, the passenger tracking system updates the passenger's boarding status to indicate that the onboard check-in for the passenger has completed. In some implementations, when an individual timer for each passenger is configured, the passenger tracking system can log the individual time for a passenger when the passenger tracking system determines that the onboard check-in for the passenger has been completed. In this case, the individual boarding timer does not run any longer and the passenger tracking system stores individual boarding time information associated with the passenger.

Figure 6:
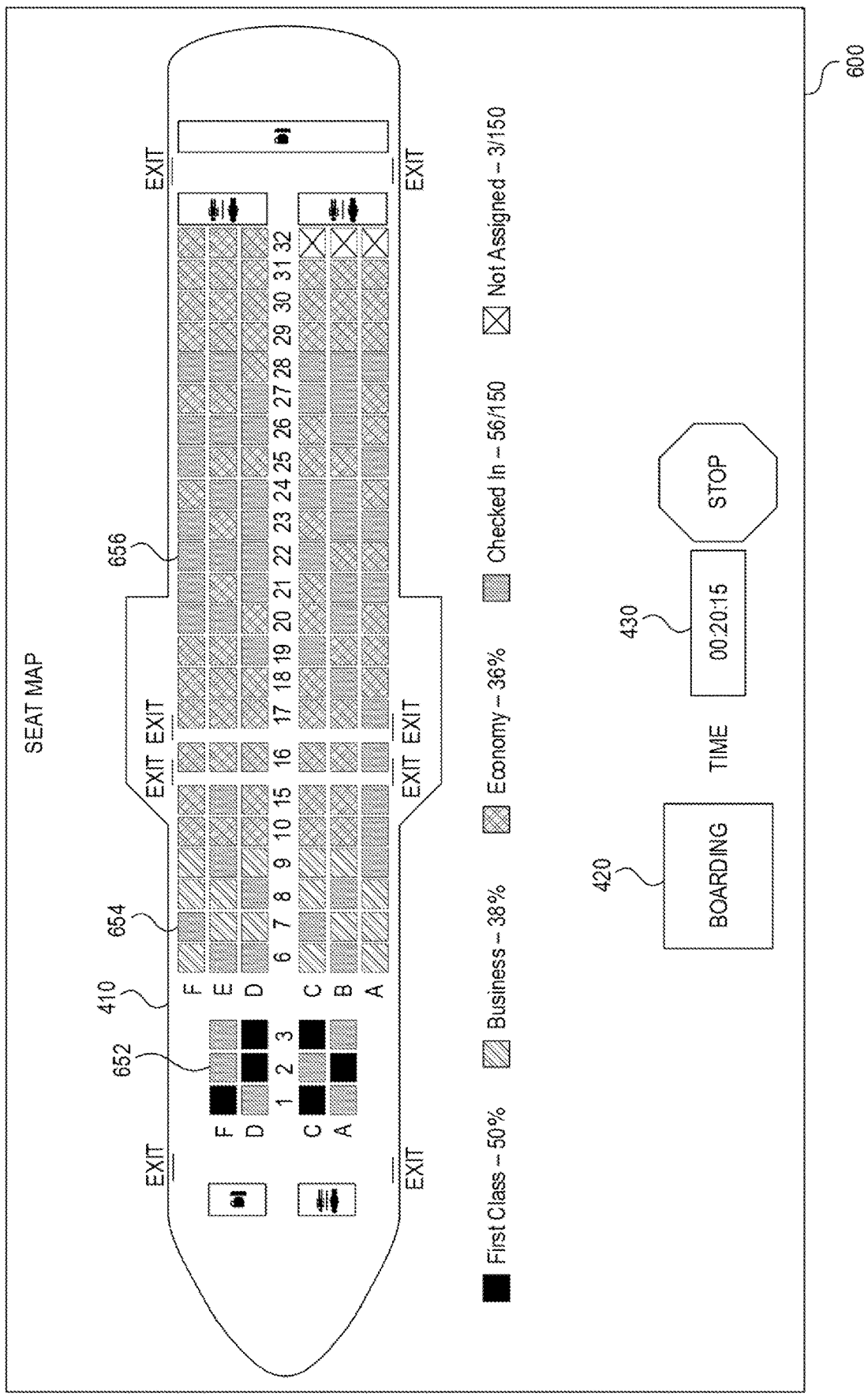
FIG. 6 illustrates an example of a screen illustrating updated boarding information provided from a passenger tracking system based on some implementations of the disclosed technology.

At an operation 360, the passenger tracking system provides the updated passenger boarding information to the ground server and/or the crew terminal. FIG. 6 illustrates an example of a screen illustrating updated passenger information provided from the passenger tracking system to the gate terminal and/or the onboard crew terminal based on some implementations of the disclosed technology. In the example, the screen 600 shows a seat map 410, a boarding state indicator 420, and a timer 430. The seat map 410 shows the checked-in seats 652, 654, 656 with a different marking (e.g., dotted visualizations) from the seats for which the onboard check-in has not been completed yet. With the seat map 410, the crew member and/or the gate agent can quickly and easily figure out the boarding status of the passenger seats, which can expedite the boarding process. Although FIG. 6 shows the checked-in seats using the dotted visualizations, other implementations are possible. For example, for visualizing the boarding status of the passengers regarding whether a passenger has been completed the onboard check-in or not, the data visualization slider to show the percentage of the onboard checked-in seats can be included in the screen 600. In addition, the screen 600 shows data, e.g., the percentages of the checked-in seats for each type of the passenger seats and the number of the checked-in passenger seats. The data included in the screen 600 and the visualization for the data as shown in FIG. 6 are examples only and various modifications can be made without being limited to those as shown in FIG. 6. In the example, the passenger tracking system may comprise a visualization module that provides a graphical representation of the passenger boarding data using numbers, colors, tables, sliders, etc.

At an operation 370, the passenger tracking system determines to end the passenger tracking process. In some implementations, the passenger tracking system determines to end the passenger tracking process when all the passengers who have checked in at the gate terminal have completed the onboard check-in. In some implementations, the passenger tracking system determines to end the passenger tracking process when the passenger tracking system receives a request from the gate terminal and/or the crew terminal to end the passenger tracking process. In some implementations, to make this request, the gate terminal and/or the crew terminal may be provided with a screen with the option to allow the crew member and/or the gate agent to end the passenger tracking process even before all the expected passengers have completed the onboard check-in. When the passenger tracking system determines to end the passenger tracking process, the passenger tracking system stops any timers that are still running. For example, the timer configured to measure the total boarding time for the airplane may stop when the passenger tracking system determines to end the passenger tracking process. The passenger tracking process may log the total boarding time and store the total boarding time.

In some implementations, after the passenger tracking system ends the passenger tracking process, at operation 380, the passenger tracking system may generate a summary of passenger tracking process and send the summary to the gate terminal and/or the crew terminal. The summary of passenger tracking process can include passenger boarding information obtained from the passenger tracking process. For example, the summary of passenger tracking process can include total boarding time for the airplane, e.g., time from when the first passenger scans the boarding pass at the gate terminal to when the passenger tracking system determines to end the passenger tracking process. In some implementations, the summary of passenger tracking process can include the individual boarding time for each passenger, e.g., time from when a particular passenger scans the boarding pass at the gate terminal to when the passenger tracking system receives the passenger codes from the particular passenger. In some implementations, the passenger boarding information that has been obtained from the passenger tracking process is sent for the analysis as further discussed with reference to FIGS. 7 to 9.

FIG. 7 shows an example of a flowchart of operations that are performed by an analysis server for analyzing passenger boarding data based on some implementations of the disclosed technology. The analysis server may be either the ground server or the onboard server, while the resources available on the onboard server might be limited as compared to those available on the ground server. The passenger boarding data to be analyzed by the analysis server may include the information included in the summary of the passenger tracking process, for example, the total boarding time for the airplane and the individual boarding time for each passenger.

At operation 710, the passenger boarding data is received from the passenger tracking system. In some implementations, when the ground server performs the analysis of the passenger boarding data, the passenger boarding data is received from the passenger tracking system using the communication between the ground server and the airplane via an antenna, directly or through satellites. When the onboard server performs the analysis of the passenger boarding data, the receiving operation 710 may correspond to the transfer of the passenger boarding data between modules of the onboard server.

At operation 720, the passenger boarding data is analyzed using various algorithms. The algorithms may be stored in a storage of the analysis server, which is either the ground server or the onboard server, and the analysis server can be configured to use a variety of resources including computer resources, storage resources, and other resources. In some implementations, the machine learning algorithms may run for the analysis of the passenger boarding data. The machine learning/AI module may be included in the analysis server that includes machine learning applications that perform various types of data analysis to automate analytical model building. Using algorithms that iteratively learn from data, machine learning applications can enable computers to learn without being explicitly programmed. The machine learning/AI module may be configured to use data learning algorithms to build models to interpret various data received from the various devices or components to detect, classify, and/or predict future outcomes. Such data learning algorithms may be associated with rule learning, artificial neural networks, inductive logic programming, and/or clustering. In some implementations, the machine learning/AI module may enable the analysis server to perceive its environment and take actions that maximize its prediction results.

In some implementations, the analysis algorithms may analyze the passenger boarding data to provide a list of passengers that exhibit efficient boarding behaviors with shorter individual boarding time as compared to the average boarding time. The average boarding time may be predetermined. The analysis algorithms may perform the analysis based on the individual boarding time and locations of passenger seats. Such analysis result can be used for targeted marketing or rewards, which can encourage the passengers to show efficient boarding behaviors. In some implementations, the analysis algorithms may analyze the passenger boarding data to provide predictions for various boarding scenarios. For example, the various boarding scenarios may include a disembarking scenario for the current airplane, future boarding/disembarking scenarios, etc. When the analysis algorithms analyze the passenger boarding data to provide the predictions for boarding/disembarking scenarios, the analysis algorithm may provide a few candidate sequences with the expected boarding/disembarking time. For example, the prediction data can map or chart patterns of boarding/disembarking scenarios of passengers based on the analysis of the passenger boarding data and allow the crew terminal to select a final sequence among the candidate sequences. In some implementations, the machine learning/AI module further suggests modifications on a selected sequence of boarding and/or disembarking process.

At operation 730, an analysis result is provided from the analysis server to at least one of the onboard server, the crew terminal, or the gate terminal. The analysis result can be provided in various forms. For example, when the analysis algorithms analyze the passenger boarding data to provide the list of passengers that exhibit efficient boarding behaviors, the analysis result is provided as the list of those passengers to be displayed on the screens of the media playback devices of the passengers. In some implementations, the IFE system can be configured to provide a public announcement on those passengers exhibiting efficient boarding behaviors to further encourage the passenger participation and engagement. For the public announcement, the IFE system prepares the audio and/or video indicating those passengers using the seat number and distributes the audio and/or video to passengers through the media playback devices or PEDs. For example, this announcement can be made by the cabin crew as the live audio or can be made by using recorded voice phrases with synthesized voice for the changing parameters, "Congratulations to <32A> for showing efficient boarding time." A similar notification can be provided as text alerts on the seatback displays. In some implementations, when the analysis algorithms analyze the passenger boarding data to provide the predictions for some boarding scenarios, the analysis result can be provided as a few candidate sequences, which are displayed to the display of at least one of media playback device, the crew terminal, or the onboard server.

FIG. 8 shows an example of a flowchart of operations that are performed by an onboard server for providing a disembarking sequence based on some implementations of the disclosed technology. The operations as shown in FIG. 8 may be performed by the onboard server.

At operation 810, the onboard server receives a request to provide a sequence for disembarking of passengers. The sequence may correspond to an order by which the passengers on the airplane are to be disembarked. In some implementations, the request may be received from the crew terminal. In this case, after receiving the request from the crew terminal, the onboard server may retrieve the analysis result of the passenger boarding data, which includes individual boarding time for each passenger. In some other implementations, the generating of the analysis result of the passenger boarding data may trigger the onboard server to provide the disembarking sequence based on the analysis result. In this case, the onboard server, which operates as the analysis server, may be automatically programmed to perform the operation to provide the disembarking sequence after the onboard server generates the analysis result. Since the disembarking sequence is provided based on the analysis result of the passenger boarding data, which is obtained at the operation 730 as shown in FIG. 7, the operations as shown in FIG. 8 may be understood as following operations that are performed after the operation 730.

At operation 820, the onboard server may perform data predictions by employing various prediction algorithms to provide a disembarking sequence. The algorithms may use at least one of a first input comprising a passenger information, a second input comprising a travel information of the airplane or a third input from the crew terminal to predict the disembarking scenarios. The passenger information may include passenger identification information, the analysis result of the passenger boarding data, history of passenger boarding data, any priority information associated with a particular passenger, connecting flight information associated with a particular passenger, etc. The analysis result of the passenger boarding data, which has been discussed with reference to FIG. 7, can be used as the first input provided to the data prediction algorithms to predict the disembarking sequence. The travel information of the airplane may include a type of the airplane, a route of the passenger vehicle, expected arrival time, etc. The third input from the crew terminal may include additional information that needs to be considered to predict the disembarking scenarios.

At operation 830, the onboard server provides a disembarking sequence to electronic devices on board, which includes media playback devices, PEDs, and the crew terminal. The disembarking sequence may be provided to the electronic devices on board in various manners, for example, in terms of forms, timings, etc. The passengers may disembark from the airplane according to the disembarking sequence.

Figure 9:
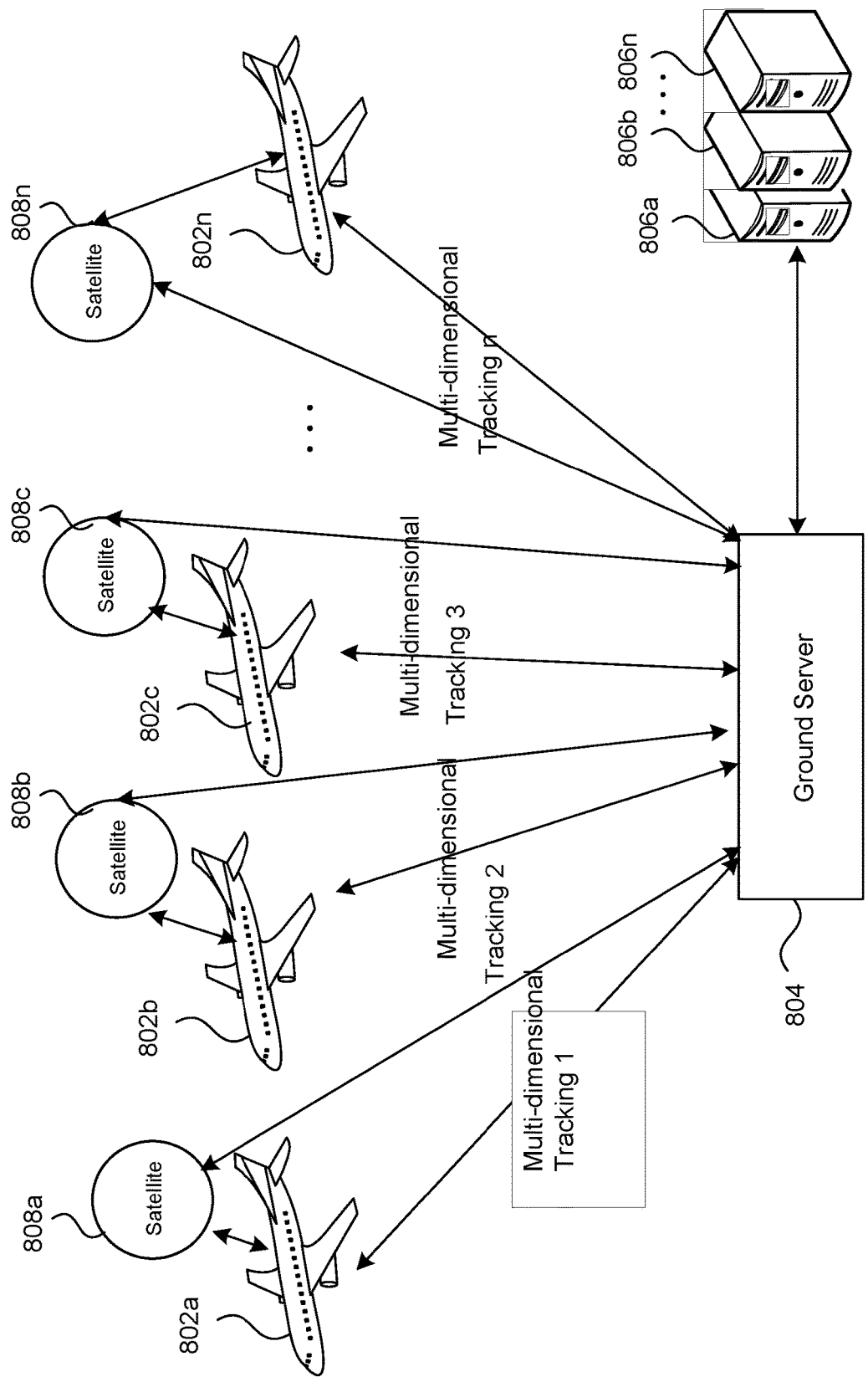
FIG. 9 shows an example of a configuration of a system for analyzing passenger boarding data based on some implementations of the disclosed technology.

FIG. 9 shows an example of a configuration of a system for analyzing passenger boarding data based on some implementations of the disclosed technology. In the example of FIG. 9, the ground server 804 operating as a data analysis server is located on the ground and communicates with airplanes 802a to 802n, satellites 808a to 808n, and external servers 806a to 806n. Each of the plurality of airplanes 802a to 802n includes an IFE system that obtains passenger boarding data from a passenger tracking process. The passenger boarding data, for example, the total boarding time for each airplane, and the individual boarding time for each passenger is provided from the airplane 802a to 802n to the ground server 804. In some implementations, the operational data of the airplane such as a type (kind) of airplane, an airplane flight route/course, etc., can be also provided from the airplane 802a to 802n to the ground server 804.

In each airplane, an onboard server can communicate with the ground server 804 via an antenna directly or through satellites 808a to 808n. Although the ground server 804 is shown in FIG. 8 as being located on the ground, the ground server 804 can be located in the cloud or at a remote location. In addition to the passenger boarding data and the operational data from the airplanes 802a to 802n, the ground server 804 can further collect additional data including previous boarding data of the passengers, previous boarding data of the airplanes for the trips with the same route, crew member information, gate agent information, etc., from the external servers 806a to 806n. The external servers 806a to 806n may be located outside of the airplanes and communicate with the ground terminal over the Internet or wired or wireless networks using a variety of communication protocols.

Figure 10:
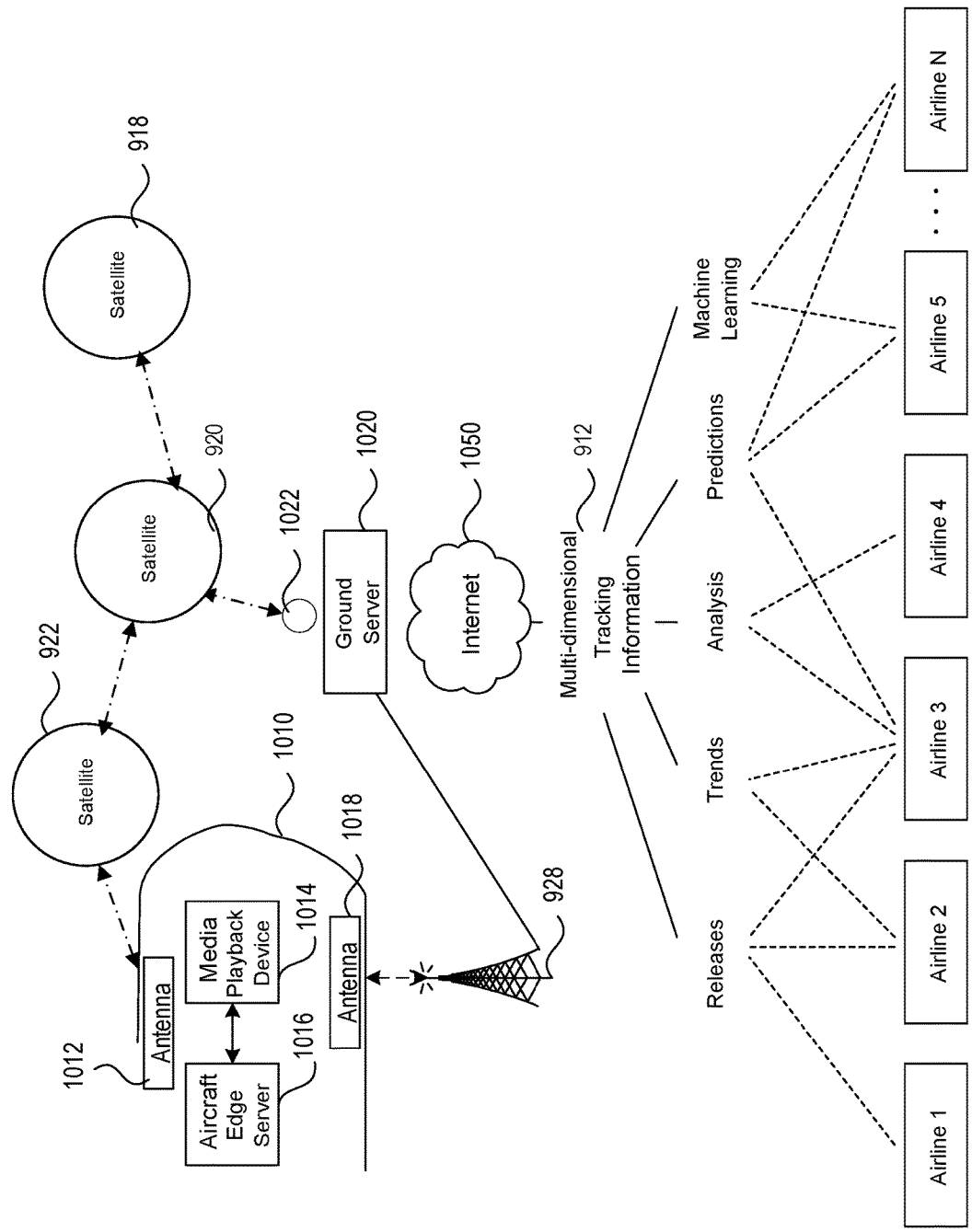
FIG. 10 shows another example of a configuration of a system for analyzing passenger boarding data based on some implementations of the disclosed technology.

FIG. 10 shows another example of a configuration of a system for analyzing passenger boarding data based on some implementations of the disclosed technology. In the example of FIG. 10, some elements of the airplane 1010 are shown, which include antennas 1012 and 1018, a media playback device 1014, and a server 1016. The media playback device 1014 is in communication with a server 1016 and the airplane 1010 is in communication with a ground server 1020 through an antenna 1012 (on airplane 1010) via one or more satellites 918, 920, 922 and/or a terrestrial communication station 928.

The antenna 1012 maybe sized and shaped to fit within the space specified by the relevant standard. For communication with geostationary satellites and providing a satisfactory communication experience for passengers on the airplane, the antenna needs to satisfy certain characters related to antenna performance. For example, G/T is a factor typically used for characterizing antenna performance, where G is the antenna gain in decibels in a receive frequency band, and T is the equivalent noise temperature in Kelvins. For example, the antenna 1012 may be configured to provide a certain range of G/T depending on area features during a travel of the airplane 1010. The G/T values are simply provided as examples and are not to be construed as limiting the various adaptive aspects described herein.

For the communications between the ground server 1020 and the airplane 1010, a ground server antenna 1022 is further provided. The ground server 1020 can retrieve data from the airplane 1010 using communication links through the antenna 1012, one or more satellites 918, 920, 922, the ground server antenna 1022, and/or the terrestrial communication station 928. In some implementations, the ground server 1020 can be communicably coupled to the Internet 1050 to retrieve processed data. The Internet 1050 is an example only and other communication protocols can be used to enable the communications between the ground server 1020 and additional servers/platforms.

As shown in FIG. 10, the processed data includes press releases, trends, data analysis, predictions, or machine learning/AI. To obtain the processed data, the ground server 1020 can be further in communication with various servers/platforms including news media servers, social media servers (e.g., Facebook or Twitter servers), and one or more analytics media platforms. The machine learning/AI module is employed to cooperate with the ground server 1020 to provide the processed data obtained from various servers/platforms. The various servers/platforms can operate as sources of various data that are related to a trip by a commercial passenger vehicle and/or passengers on board and provide any related information such as the number of flights, the number of expected passengers, airport traffic, crew availability information, airplane information, passenger information such pass travel history, etc., to the ground server 1020 (and/or the machine learning/AI module). Such data can be utilized by the ground server 1020 (and/or the machine learning/AI module) to perform the analysis of the passenger boarding data. Although it is shown in FIG. 10 that the machine learning/AI module is implemented outside of the ground server 1020, it is also possible that the ground server 1020 is configured to include the machine learning/AI module.

In some implementations, the machine learning/AI module may compile coded descriptions into lower-level structured data objects that a machine can more readily understand, build a network topology of the main problem concept and sub-concepts covering aspects of the problem to be solved, train codified instantiations of the sub-concepts and main concept, and execute a trained AI model containing one, two, or more neural networks. The machine learning/AI module can abstract a way and automate the low-level mechanics of AI, and the machine learning/AI module can manage and automate much of the lower-level complexities of working with AI. Each program developed in a pedagogical programming language can be fed into the machine learning/AI module to generate and train appropriate intelligence models. The machine learning/AI module can be a cloud-hosted platform configured to manage complexities inherent to training AI networks. Thus, the machine learning/AI module can be accessible with one or more client-side interfaces to allow third parties to submit a description of a problem in a pedagogical programming language and let the online AI engine build and generate a trained intelligence model for one or more of the third parties. In some embodiments, the machine learning/AI module employs algorithms to predict time for boarding and/or disembarking based on various boarding scenarios. In some implementations, the machine learning/AI module may collect boarding data for passengers expected to be on board for an airplane and provide a few candidate sequences with the expected boarding or disembarking time. For example, the prediction data can map or chart patterns of boarding and/or disembarking of an airplane and allow to select a sequence among the candidate sequences. In some implementations, the machine learning/AI module further suggests modifications on a selected sequence of boarding and/or disembarking process.

For example, the ground server 1020 operates to obtain information from news media server and/or social media servers and performs machine learning techniques to predict a boarding time for an airplane. For example, the ground server 1020 can operate together with a teleport usage algorithm that predicts, documents (logs), and redirects teleport communication traffic to one or more best teleport beams based one or more factors including: historical weather data, live weather data, airplane antenna positional information, airplane antenna pointing angle, airplane antenna line of sight measurements, and feed-beam distribution patterns. While FIG. 10 shows the implementation that the analysis server is implemented as the ground server 1020 on the ground, other implementations are also possible. For example, the analysis server can be configured in a cloud with processing units and databases, which are able to be connected over a wide area network, such as the Internet, from multiple computing devices, and then the backend of the cloud platform is configured to handle the operations of the analysis server including operations discussed above for the ground server 1020 in FIG. 10, by dynamically calling in additional computing hardware machines to load on and run the independent processes as needed. In some implementations, depending on the utilization of the analysis result, the ground server 1020 may not need the real time communications with the airplane. In that case, the ground server 1020 can obtain necessary data for the prediction of the outage from the external servers or data storages in communication with the ground server 1020.

In accordance with the disclosed technology herein, some embodiments may incorporate the following technical solutions.

1. A system for tracking passenger behaviors of passengers on a commercial passenger vehicle, comprising: media playback devices located on the commercial passenger vehicle, the media playback devices being associated with passenger seats and configured to operate in an onboard check-in mode in which the media playback devices receive passenger identification information of the passengers; and an onboard server in communication with the media playback devices and configured to receive, from a media playback device associated with a passenger seat of a passenger, passenger identification information of the passenger and update passenger boarding information to indicate a completion of a boarding process of the passenger; wherein the onboard server is further configured to provide, to at least one of a ground terminal located outside of the commercial passenger vehicle or a crew terminal on the commercial passenger vehicle, passenger boarding information that enables determination of a time interval between a start of the boarding process by each passenger and an end of the boarding process as indicated from the media playback devices. The boarding process by each passenger may start when each passenger's boarding pass is scanned at the gate terminal and end when each passenger completes the onboard boarding check-in from the passenger seats associated with the passengers.
2. The system of solution 1, wherein the media playback device is configured to receive the passenger identification information of the passenger by capturing an image of the passenger identification information included in a boarding pass of the passenger or stored on a passenger electronic device associated with the passenger.
3. The system of solution 1, wherein the media playback device is configured to receive the passenger identification information of the passenger from a passenger electronic device of the passenger.
4. The system of solution 1, wherein the media playback device is configured to display a message requesting the passenger to provide the passenger identification information to complete the boarding process for the passenger.
5. The system of solution 1, wherein the onboard server is further configured to receive, from at least one of the ground terminal or the crew terminal, a notification indicating the start of the boarding process by the passenger.
6. The system of solution 1, wherein the onboard server is further configured to receive, from at least one of the ground terminal or the crew terminal, a notification indicating the start of a boarding process for the commercial passenger vehicle, and wherein the passenger boarding information further includes total boarding time for the commercial passenger vehicle that is from the start of the boarding process for the commercial passenger vehicle and an end of the boarding process for the commercial passenger vehicle. The total boarding time may differ from the individual boarding time in that the total boarding time is determined for eh commercial passenger vehicle, not for each passenger.
7. The system of solution 1, wherein the onboard server is further configured to apply at least one of an analysis algorithm or a machine learning algorithm that processes the passenger boarding information of the passenger and additional passenger boarding information of additional passengers and generate (1) a list of passengers that exhibit efficient boarding behaviors that correspond to shorter time intervals associated with some passengers as compared to an average of time intervals associated with the passengers, a disembarking sequence indicating an order by which the passengers on the commercial passenger vehicle are to be disembarked from the commercial passenger vehicle.

8. The system of solution 1, wherein the onboard server is in communication with a ground server and further configured to provide the passenger boarding information to the ground server such that the ground server applies a machine learning algorithm that processes the passenger boarding information from the onboard server and another commercial passenger vehicle and generates a boarding sequence or disembarking sequence for a future trip.

9. The system of solution 1, wherein the onboard server is configured to, in response to receiving of the passenger identification information from the media playback device associated with the passenger, change a boarding status of the passenger to a check-in status indicating that the passenger has completed the boarding process of the passenger.

10. The system of solution 1, wherein the onboard server is further configured to, in response to receiving of the passenger identification information from the media playback device associated with the passenger, stop a timer configured to measure the time interval and record time as the time interval associated with the passenger.

11. The system of solution 1, wherein the onboard server includes a visualization module that provides a graphical representation of the passenger boarding information that further includes at least one of a number of passenger seats associated with passengers who have completed the boarding process, a number of passenger seats not assigned to any passengers, or a percentage of each type of passenger seats associated with the passengers who have completed the boarding process.

Figure 11:
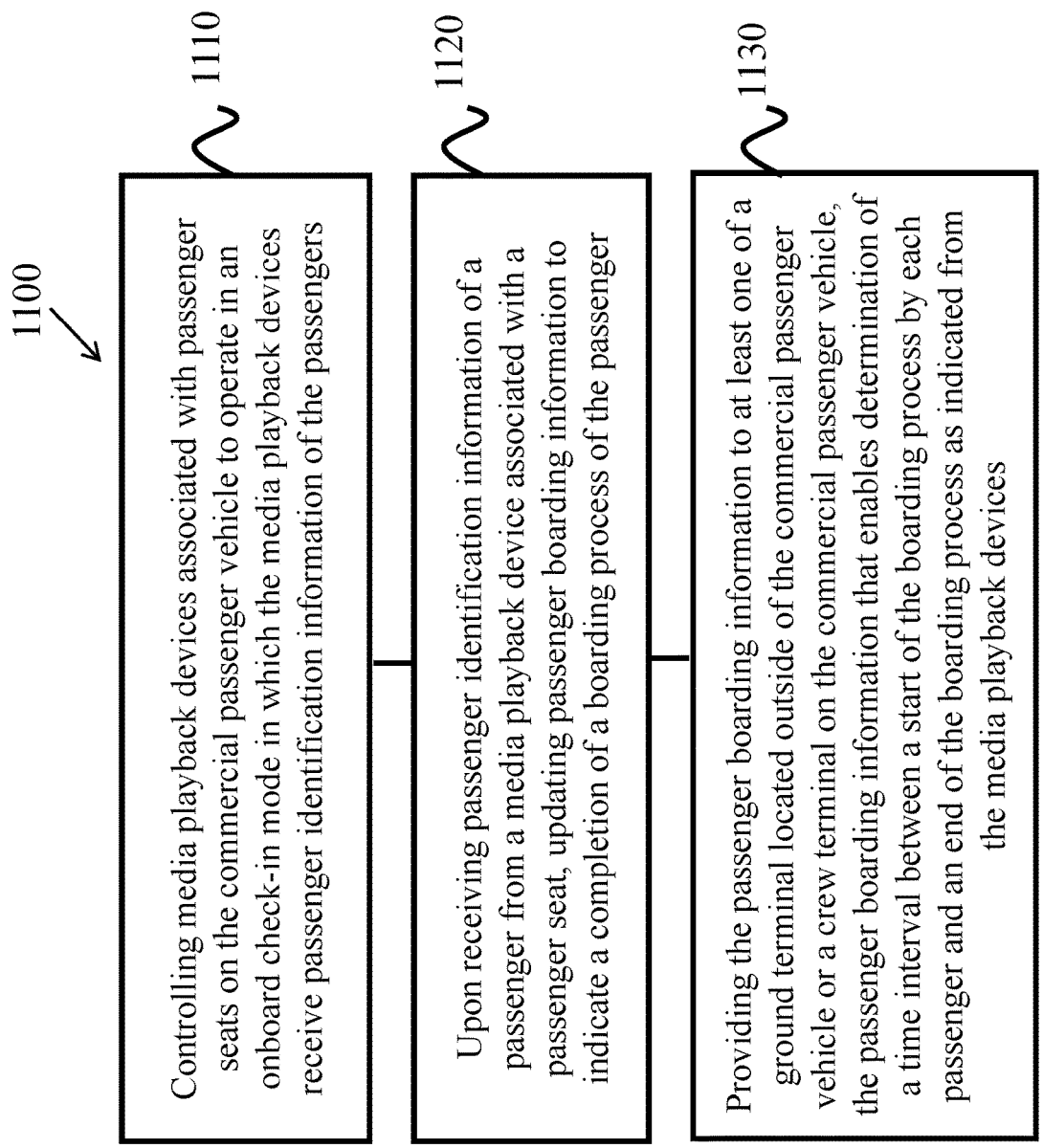
FIG. 11 is an example flowchart of a method for tracking passenger behaviors of passengers on a commercial passenger vehicle based on some implementations of the disclosed technology.

12. A method (e.g., method 1100 as shown in FIG. 11) for tracking passenger behaviors of passengers on a commercial passenger vehicle, comprising: controlling 1110 media playback devices associated with passenger seats on the commercial passenger vehicle to operate in an onboard check-in mode in which the media playback devices receive passenger identification information of the passengers; upon receiving passenger identification information of a passenger from a media playback device associated with a passenger seat, updating 1120 total passenger boarding information to indicate a completion of a boarding process of the passenger; and providing 1130 the passenger boarding information to at least one of a ground terminal located outside of the commercial passenger vehicle or a crew terminal on the commercial passenger vehicle, the passenger boarding information that enables determination of a time interval between a start of the boarding process by each passenger and an end of the boarding process as indicated from the media playback devices. The boarding process by each passenger may start when each passenger's boarding pass is scanned at the gate terminal and end when each passenger completes the onboard boarding check-in from the passenger seats associated with the passengers.

13. The method of solution 12, further comprising: receiving, from the ground terminal, a notification indicating a start of a boarding process for the commercial passenger vehicle, and wherein the passenger boarding information further includes total boarding time for the commercial passenger vehicle that is from the start of the boarding process for the commercial passenger vehicle and an end of the boarding process for the commercial passenger vehicle. The total boarding time may differ from the individual boarding time in that the total boarding time is determined for eh commercial passenger vehicle, not for each passenger.

14. The method of solution 12, further comprising: receiving, from the ground terminal, a notification indicating the start of the boarding process by the passenger.

15. The method of solution 12, further comprising: applying at least one of an analysis algorithm or a machine learning algorithm that processes the passenger boarding information of the passenger and additional passenger boarding information of additional passengers and generates (1) a list of passengers that exhibit efficient boarding behaviors that correspond to shorter time intervals associated with some passengers as compared to an average of time intervals associated with the passengers.

16. The method of solution 12, wherein the updating of the passenger boarding information includes: upon receiving the passenger identification information from the media playback device associated with the passenger seat, changing a boarding status of the passenger to a check-in status indicating that the passenger has completed the boarding process of the passenger.

17. The method of solution 12, wherein the updating of the passenger boarding information includes: upon receiving the passenger identification information from the media playback device associated with the passenger seat, stopping a timer configured to measure the time interval associated with the passenger.

18. The method of solution 12, further comprising: upon receiving the passenger identification information from the media playback device associated with the passenger seat, controlling the media playback device associated with the passenger seat to stop operating in the check-in mode and start operating in an entertainment mode that allows the media playback device to provide entertainment content to the passenger.

19. The method of solution 12, further comprising: determining that passenger identification information of all passengers on board is received or whether a request from the crew terminal or the ground terminal to end the check-in mode is received, and wherein the passenger boarding information further includes total boarding time for the commercial passenger vehicle that is from the start of the boarding process for the commercial passenger vehicle and an end of the boarding process for the commercial passenger vehicle.

20. The method of solution 12, wherein the providing of the passenger boarding information includes providing a graphical representation of the passenger boarding information that further includes at least one of a number of passenger seats associated with passengers who have completed the boarding process, a number of passenger seats not assigned to any passengers, or a percentage of each type of passenger seats associated with the passengers who have completed the boarding process.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this patent document.

What is claimed is:

1. A system for tracking passenger behaviors of passengers on a commercial passenger vehicle, comprising:
   media playback devices located on the commercial passenger vehicle, the media playback devices being associated with passenger seats and configured to operate in an onboard check-in mode in which the media playback devices receive passenger identification information of the passengers; and
   an onboard server in communication with the media playback devices and configured to receive, from a media playback device associated with a passenger seat of a passenger, passenger identification information of the passenger and update passenger boarding information to indicate a completion of a boarding process of the passenger;
   wherein the onboard server is further configured to provide, to at least one of a ground terminal located outside of the commercial passenger vehicle or a crew terminal on the commercial passenger vehicle, passenger boarding information that enables determination of a time interval between a start of the boarding process by each passenger and an end of the boarding process as indicated from the media playback devices.

2. The system of claim 1, wherein the media playback device is configured to receive the passenger identification information of the passenger by capturing an image of the passenger identification information included in a boarding pass of the passenger or stored on a passenger electronic device associated with the passenger.

3. The system of claim 1, wherein the media playback device is configured to receive the passenger identification information of the passenger from a passenger electronic device of the passenger.

4. The system of claim 1, wherein the media playback device is configured to display a message requesting the passenger to provide the passenger identification information to complete the boarding process for the passenger.

5. The system of claim 1, wherein the onboard server is further configured to receive, from at least one of the ground terminal or the crew terminal, a notification indicating the start of the boarding process by the passenger.

6. The system of claim 1, wherein the onboard server is further configured to receive, from at least one of the ground terminal or the crew terminal, a notification indicating the start of a boarding process for the commercial passenger vehicle, and
   wherein the passenger boarding information further includes total boarding time for the commercial passenger vehicle that is from the start of the boarding process for the commercial passenger vehicle and an end of the boarding process for the commercial passenger vehicle.

7. The system of claim 1, wherein the onboard server is further configured to apply at least one of an analysis algorithm or a machine learning algorithm that processes the passenger boarding information of the passenger and additional passenger boarding information of additional passengers and generate (1) a list of passengers that exhibit efficient boarding behaviors that correspond to shorter time intervals associated with some passengers as compared to an average of time intervals associated with the passengers, a disembarking sequence indicating an order by which the passengers on the commercial passenger vehicle are to be disembarked from the commercial passenger vehicle.

8. The system of claim 1, wherein the onboard server is in communication with a ground server and further configured to provide the passenger boarding information to the ground server such that the ground server applies a machine learning algorithm that processes the passenger boarding information from the onboard server and another commercial passenger vehicle and generates a boarding sequence or disembarking sequence for a future trip.

9. The system of claim 1, wherein the onboard server is configured to, in response to receiving of the passenger identification information from the media playback device associated with the passenger, change a boarding status of the passenger to a check-in status indicating that the passenger has completed the boarding process of the passenger.

10. The system of claim 1, wherein the onboard server is further configured to, in response to receiving of the passenger identification information from the media playback device associated with the passenger, stop a timer configured to measure the time interval and record time as the time interval associated with the passenger.

11. The system of claim 1, wherein the onboard server includes a visualization module that provides a graphical representation of the passenger boarding information that further includes at least one of a number of passenger seats associated with passengers who have completed the boarding process, a number of passenger seats not assigned to any passengers, or a percentage of each type of passenger seats associated with the passengers who have completed the boarding process.

12. A method for tracking passenger behaviors of passengers on a commercial passenger vehicle, comprising:
controlling media playback devices associated with passenger seats on the commercial passenger vehicle to operate in an onboard check-in mode in which the media playback devices receive passenger identification information of the passengers;
upon receiving passenger identification information of a passenger from a media playback device associated with a passenger seat, updating passenger boarding information to indicate a completion of a boarding process of the passenger; and
providing the passenger boarding information to at least one of a ground terminal located outside of the commercial passenger vehicle or a crew terminal on the commercial passenger vehicle, the passenger boarding information that enables determination of a time interval between a start of the boarding process by each passenger and an end of the boarding process as indicated from the media playback devices.

13. The method of claim 12, further comprising:
receiving, from the ground terminal, a notification indicating a start of a boarding process for the commercial passenger vehicle, and
wherein the passenger boarding information further includes total boarding time for the commercial passenger vehicle that is from the start of the boarding process for the commercial passenger vehicle and an end of the boarding process for the commercial passenger vehicle.

14. The method of claim 12, further comprising:
receiving, from the ground terminal, a notification indicating the start of the boarding process by the passenger.

15. The method of claim 12, further comprising:
applying at least one of an analysis algorithm or a machine learning algorithm that processes the passenger boarding information of the passenger and additional passenger boarding information of additional passengers and generates (1) a list of passengers that exhibit efficient boarding behaviors that correspond to shorter time intervals associated with some passengers as compared to an average of time intervals associated with the passengers.

16. The method of claim 12, wherein the updating of the passenger boarding information includes: upon receiving the passenger identification information from the media playback device associated with the passenger seat, changing a boarding status of the passenger to a check-in status indicating that the passenger has completed the boarding process of the passenger.

17. The method of claim 12, wherein the updating of the passenger boarding information includes: upon receiving the passenger identification information from the media playback device associated with the passenger seat, stopping a timer configured to measure the time interval associated with the passenger.

18. The method of claim 12, further comprising:
upon receiving the passenger identification information from the media playback device associated with the passenger seat, controlling the media playback device associated with the passenger seat to stop operating in the check-in mode and start operating in an entertainment mode that allows the media playback device to provide entertainment content to the passenger.

19. The method of claim 12, further comprising:
determining that passenger identification information of all passengers on board is received or whether a request from the crew terminal or the ground terminal to end the check-in mode is received, and
wherein the passenger boarding information further includes total boarding time for the commercial passenger vehicle that is from the start of the boarding process for the commercial passenger vehicle and an end of the boarding process for the commercial passenger vehicle.

20. The method of claim 12, wherein the providing of the passenger boarding information includes providing a graphical representation of the passenger boarding information that further includes at least one of a number of passenger seats associated with passengers who have completed the boarding process, a number of passenger seats not assigned to any passengers, or a percentage of each type of passenger seats associated with the passengers who have completed the boarding process.

* * * * *